United States Patent [19]

Eloranta et al.

[11] 4,119,369
[45] Oct. 10, 1978

[54] VARIABLE DENSITY OPHTHALMIC DEVICE

[75] Inventors: Vaito K. Eloranta, Needham; Benjamin C. Ruggles, Jr., Gloucester, both of Mass.

[73] Assignee: Polaroid Corporation, Cambridge, Mass.

[21] Appl. No.: 608,401

[22] Filed: Aug. 27, 1975

[51] Int. Cl.² .............................................. G02C 7/12
[52] U.S. Cl. ...................................... 351/49; 351/47; 351/57
[58] Field of Search ................. 351/49, 57, 58, 47; 350/156

[56] References Cited

U.S. PATENT DOCUMENTS

| | | | |
|---|---|---|---|
| 1,614,827 | 1/1927 | Coats | 351/58 |
| 1,661,967 | 3/1928 | Savoie | 351/58 |
| 2,005,426 | 6/1935 | Land | 351/49 |
| 2,206,880 | 7/1940 | Cozzens | 351/49 |
| 2,251,330 | 8/1941 | Fairbanks | 351/49 |
| 2,304,504 | 12/1942 | Metzger | 350/156 |
| 2,380,481 | 7/1945 | Tillyer | 351/49 |

*Primary Examiner*—Harold A. Dixon
*Attorney, Agent, or Firm*—Stanley H. Mervis; Sheldon W. Rothstein

[57] ABSTRACT

An ophthalmic device comprising superposed pairs of light polarizing elements, one pair of such elements being fixed and the other pair being rotatable with respect to the fixed pair to provide a variable light transmission feature. The fixed pair of elements is retained by a frame member having an arcuate peripheral portion which engages a rotatable light polarizing element biasing means which is fixedly attached to each rotatable light polarizing element and prevents substantial axial movement of the rotatable light polarizing element.

7 Claims, 5 Drawing Figures

U.S. Patent  Oct. 10, 1978  4,119,369
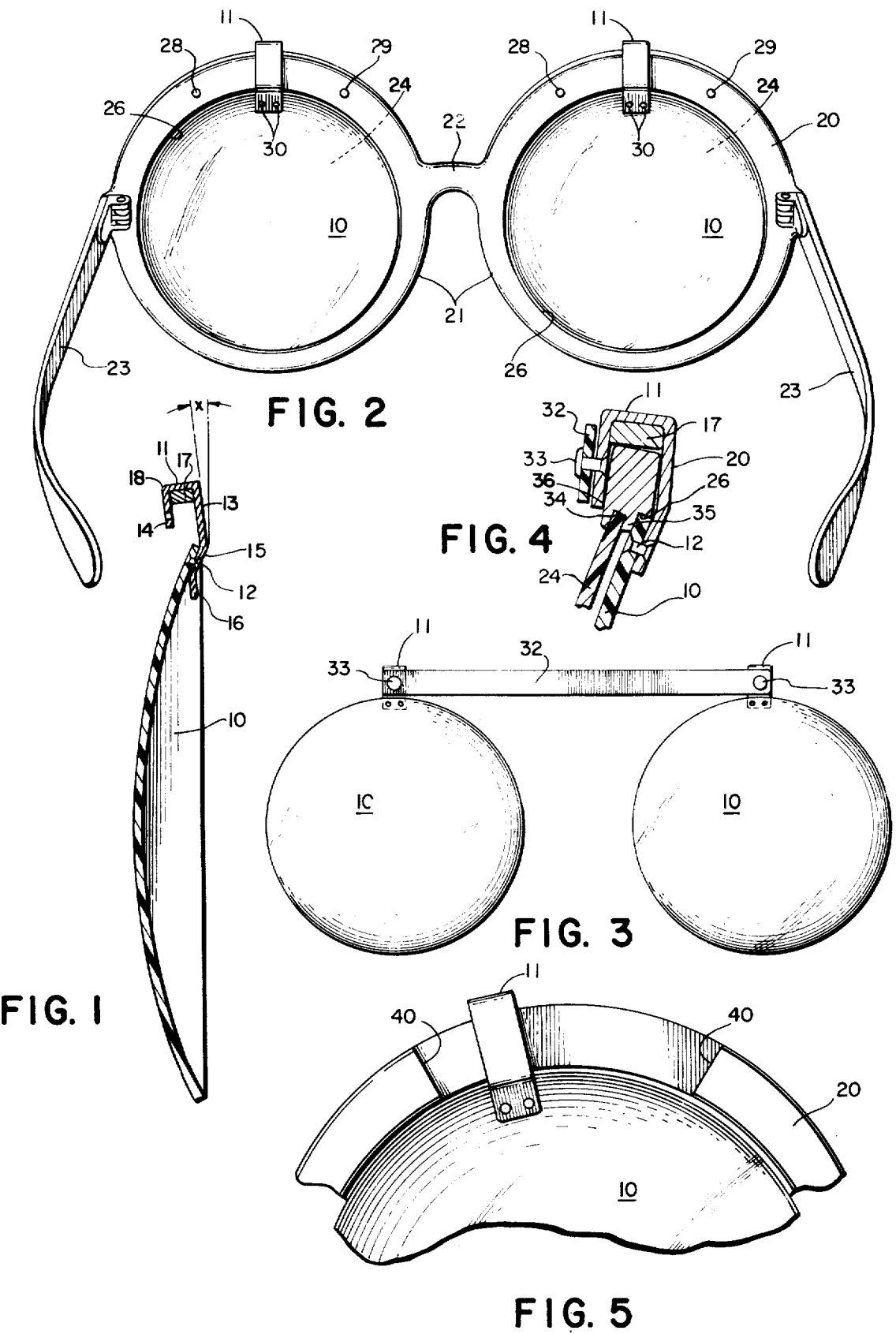

VARIABLE DENSITY OPHTHALMIC DEVICE

BACKGROUND OF THE INVENTION

The present invention is directed toward an ophthalmic device comprising superposed pairs of light polarizing elements, one of such pairs being fixedly retained in a frame member while the elements of the other such pair are rotatable.

The concept of providing variable light transmission characteristics to an ophthalmic device by employing light polarizing elements which may be rotated with respect to each other is not in and of itself novel. For background information on systems of this type, reference should be had to U.S. Pat. No. 2,005,246 issued to E. H. Land on June 18, 1935; U.S. Pat. No. 2,251,330 issued to M. N. Fairbank on Aug. 5, 1941; and U.S. Pat. No. 2,565,362 issued to V. K. Eloranta on Aug. 21, 1951. Each of the foregoing patented inventions, while generally comprising devices for providing variable light transmission by employing light polarizers, have a common problem in that the mechanisms employed to retain the rotatable light polarizing element in engagement with the frame member comprise bearing surfaces which inhibit free axial movement of the rotatable light polarizing elements and introduce enough friction during rotation that binding may occur. Note, for example, FIG. 3 of forementioned U.S. Pat. No. 2,005,426 where elements 13 engage rotatable light polarizing elements 14 and provide bearing surfaces which cause binding of the rotating element. The same problem is evident in the figure of U.S. Pat. No. 2,251,330. Also, FIG. 1 of U.S. Pat. No. 2,565,362 shows that immediately behind rotatable light polarizing elements 64 and 66 is a fiber spacing member 76 which not only provides constraint against axial movement but, as in the other referred to patents, causes binding which inhibits easy rotation of the rotatable elements.

BRIEF SUMMARY OF THE INVENTION

Given this background it has been discovered that by employing a novel arrangement of biasing means fixedly attached to each element of a pair of rotatable light polarizing elements superposed with a pair of fixed light polarizing elements secured in a frame member, the binding which occurs in the prior art devices as a result of employing bearing surfaces to inhibit axial movement of the rotatable lens is avoided. This is preferably accomplished, in part, by using an eyeglass frame having generally circularly configured lens-retaining segments connected by a bridge as a frame member. In the preferred embodiment of the present invention the fixed light polarizing element will be the element furthest from the viewer's eyes while the rotatable element will generally be located superposed and substantially coextensive with a corresponding circular portion of the fixed light polarizing element at a position between the fixed light polarizing element and the viewer's eyes. It will be evident that should the operator so desire a system encompassed by the present invention may include rotatable light polarizing elements which are on the side of the fixed light polarizing elements opposed to viewer's eyes.

The essence of the present invention is partly in appreciating that in order to produce a commercially acceptable variable density light transmitting ophthalmic device which can gain public acceptance and be relatively inexpensive to produce, the problem of undue friction with respect to the rotatable element must be overcome. Until the present invention no system, to the inventor's knowledge, has been devised which employs only biasing to maintain a rotatable light polarizing element in a predetermined axial position with respect to a fixed light polarizing element in an ophthalmic device. Sufficient axial force is applied by the biasing member in a direction toward the fixed light polarizing member to cause the rotatable member to bear against either a portion of the frame member which retains the fixed light polarizing elements, or the fixed light polarizing elements themselves, whereby even dropping the device and rough treatment by the wearer will not cause the rotatable light polarizing elements to disengage themselves from the ophthalmic device.

Another important aspect of the preferred embodiment of the present invention is the fact that the rotatable light polarizing elements can be made to rotate in unison by connecting the biasing means of each of the elements comprising the pair of rotatable light polarizing elements to a common link or tie bar which assures that rotation of one of said rotatable elements will be matched by equal rotation of the other of said rotatable elements. In this way the density of both sides of the ophthalmic device will be essentially the same at all times. It is evident, however, that the present invention may be practiced without a tie bar. In such an instance a wearer may individually adjust the densities of each side of the ophthalmic device to suit his particular taste. The biasing means provides a suitable reference point for "dialing in" for both eyes a particular matching pair of density values in conjunction with, for example, a density scale which may be engraved on the frame member.

It is, accordingly, a primary object of the present invention to provide a variable density ophthalmic device which comprises superposed pairs of light polarizing elements wherein one of said pairs is fixedly mounted in a frame member while the other of said pairs is rotatable with respect to said fixed pair of light polarizing elements, and binding caused by frictional engagement of surfaces of the frame member with the rotatable elements is eliminated.

It is further an object of the invention to provide a rotatable light polarizing element having fixedly attached thereto a biasing means capable of engaging an arcuate portion of the frame member whereby said biasing means provides sufficient biasing force to said rotatable light polarizing element in the direction toward the fixed light polarizing element to assure that the rotatable light polarizing element will be constrained against substantial axial movement.

It is another object of the invention to provide an ophthalmic device of the aforenoted type wherein the frame member comprises a pair of substantially circular lips, each of which engages one of the rotatable light polarizing elements and constrains the element against substantial radial movement.

It is still another object of the invention to provide an ophthalmic device of the forenoted type wherein the biasing means fixedly attached to each rotatable light polarizing element are connected each to the other by a tie bar through a means which allows rotation between the tie bar and the biasing means whereby rotation of one of the rotatable light polarizing elements results in substantially the same rotation of the other rotatable light polarizing elements.

For a fuller understanding of the nature and objects of this invention reference should be had to the following detailed description of the invention taken in connection with the accompanying drawings wherein;

FIG. 1 is a sectional side view of a single rotatable lens element of the present invention showing the relationship of the lens to the fixedly attached biasing means.

FIG. 2 is a perspective view of an ophthalmic device of the present invention depicting a pair of rotatable lenses in position on a frame member and superposed with a pair of fixed light polarizing elements.

FIG. 3 is a front view of the rotatable light polarizing elements, biasing means and tie bar.

FIG. 4 is a partial sectional side view of the preferred embodiment of the present invention and depicts the relationship of the frame member, biasing means, fixed and rotatable light polarizing lenses, and tie bar; and FIG. 5 is a partial sectional rear view of the preferred embodiment of the present invention including a cut-out frame member portion which serves to limit rotation of the rotatable light polarizing elements.

DETAILED DESCRIPTION OF THE INVENTION

Referring now to the drawings, FIG. 1 depicts a single light polarizing ophthalmic element 10 which is fixedly attached to biasing means 11 by means of rivets 12. Biasing means 11 comprises a generally U-shaped member, one leg 13 of which is longer than the other leg 14. Leg 13 comprises an end portion 15 generally offset from the remainder of leg 13 toward leg 14 to accommodate any curvature of element 10 and to provide biasing forces when engaged with a frame member. That offset portion 15 is the biasing means component which is fixedly attached to light polarizing element 10 through rivets 12. An additional offset portion 16 is shown at the terminal end of leg 13 and, in use, would be available as an aid in removing the rotatable lens assembly from the ophthalmic device which it comprises. In practice the wearer could insert a fingernail under projecting end 16 and flex the biasing means to release the rotatable lens assembly from the ophthalmic device. Insert 17 is depicted between legs 13 and 14 of the biasing means and in abutting relationship with cross-member 18 which completes the U-shaped biasing means. In operation insert 17 would bear against an arcuate portion of the frame member so that forces exerted by the wearer on biasing means 11 in order to accomplish rotation of the light polarizing element would not result in significant radial movement of the rotatable lens along a diametric axis through the biasing means. In the unengaged position, leg 13 between cross-member 18 and offset portion 15 would be offset about 2°-5° from the normal to establish proper biasing as shown by X.

FIG. 2 is a perspective rear view of the ophthalmic device of the present invention. Frame member 20 generally comprises 2 circular fixed light polarizing element retaining segments 21 which are joined by bridge 22. Each of the circular segments are attached at a point generally opposite the point at which they join bridge 22 to foldable frame member temples 23. Light polarizing elements 24, which are fixed in place, are seated in a channel 34 in circular segments 21, which will be further described with reference to FIG. 4. Rotatable light polarizing elements 10 are superposed on light polarizing elements 24 and constrained from radial movement by lips 26, which are preferably annular channels, though they may comprise discontinuous segments, which are in loose abutment with the outer periphery of circular polarizers 10. The biasing means 11 are as described with respect to FIG. 1. Cross member 18 generally extends over the top of an arcuate portion of the frame member 20 and leg 14 of the biasing means generally hugs the front surface of the arcuate area of the frame member along which the biasing means is designed to travel. That arcuate area is essentially defined by stops 28 and 29 which limit the travel of the biasing means and essentially fix the amount of rotation through which rotatable light polarizing elements 10 can travel. Stops 28 and 29 need be no more than small projections or pins which are capable of stopping the travel of biasing means 11. In inserting rotatable light polarizing elements 10 and attached biasing means 11 onto the frame member 20, the biasing means is slightly flexed and the light polarizing elements are snapped into place within the confines of frame member lips 26. Sufficient biasing force is applied by biasing means 11 through rivets 12 to hold the rotatable light polarizing members securely in place against fixed light polarizing elements 24 and eliminate substantial axial movement. The rotatable light polarizing elements 10 essentially float against fixed light polarizing elements 24. Even if the elements employed were identically curved, the inner surface of one would have a different curvature than the outer surface of the other (different diameters). The thicker the lenses the greater the difference. Accordingly, the only contact between the elements will be along the outer edges. It may be desirable, however, to go further. For example, in one embodiment, the fixed light polarizing element will have a curvature of about 6 diopters while the rotatable light polarizing element will have a curvature of about 5½ diopters.

Referring now to FIG. 3 a front view of the rotatable light polarizing elements depicted in FIG. 2 is shown. Light polarizing elements 10 are shown connected to biasing means 11 through rivets 12. Tie bar 32 connects biasing means 11 by means of single rivets 33 which permit rotation of the biasing means about the tie bar. As the tie bar is moved in one direction or another when the rotatable light polarizing lenses are in place in an ophthalmic device, the rotatable light polarizing elements will rotate a substantially identical number of degrees. In this way the variable density effect will be substantially identical on each side of the ophthalmic device. It has been found preferable to manufacture the tie bar out of a somewhat flexible synthetic plastic material such as polystyrene so that any curvature imparted by the spectacle frames will not cause binding due to a stiff tie bar.

In FIG. 4, the preferred embodiment of the present invention is depicted in a side sectional view of the rotatable and fixed light polarizing lenses in conjunction with the biasing means, tie bar and frame member. Fixed light polarizing element 24 is seated in frame member channel 34. Projection 35 which is molded into the frame member serves not only to secure fixed light polarizing element 24 in place but acts as a bearing surface for rotatable light polarizing element 10, which is connected to biasing means 11 as described above. Biasing means 11 is in turn shown bearing against the front surface of an arcuate frame member at 36 and provides biasing to the rotatable light polarizing element 10 to secure it against axial movement away from bearing member 35. Optionally insert 17, which is no more than a plastic or metal shim, may be employed to assure that the force used by the wearer will not be sufficient to deform the biasing means and accidentally snap the lenses out of place since it will bear on the outer edge of the frame member. The lip 26 in which the rotatable light polarizing elements generally float will preferrably be at least as deep as the thickness of light polarizing element 10 and perhaps even slightly deeper to assure adequate radial constraint of rotatable light polarizing element 10. Tie bar 32 and rivet 33 are shown as described in FIG. 3.

With reference to FIG. 5, the preferred embodiment of the present invention is depicted in rear sectional view wherein stops 40 are machined adjacent the arcuate area of the lens retaining means to limit the amount of travel of biasing means 11 thereby permitting rotatable light polarizing elements 10 to travel only through a predetermined arc. Both rotatable and fixed elements have curvatures of 6 diopters.

It has been found that 15° to 45° of rotation is generally adequate to provide the wearer with a sufficient range of light transmission characteristics to generally satisfy most conditions. It is a principal advantage of the present invention that these densities can be almost instantly obtained with a flick of the finger and have a far greater range than the densities that can be obtained by present day photochromic systems.

It is preferred that in the present invention the light polarizing element comprise a suitable commercially available linear light polarizing synthetic plastic material such as "H" sheet, which is a stained, oriented polyvinyl alcohol film commercially available from Polaroid Corporation, Cambridge, Massachusetts.

In addition it is suggested that at least one of the pairs of light polarizing elements (fixed or rotatable) contain an appropriate infrared radiation absorbing dye such as, for example, the absorbers disclosed in U.S. Pat. Nos. 3,850,502 and 3,588,216, each issued to S. M. Bloom.

The biasing means of the present invention is preferably made of phosphor bronze though numerous spring materials such as beryllium copper, etc. may be used. In addition it is suggested that the biasing means may be molded out of a synthetic plastic material such as, for example, polypropylene and heat staked to the light polarizing element. This would not only provide an inexpensive and simple means of making the rotatable light polarizing elements of the present invention but would permit the molding of an insert such as shim 17 depicted in FIGS. 1 and 4, along with perhaps a knurled surface on the top of cross member portion 18 of the biasing means to facilitate movement of the biasing means.

Throughout the specification reference has been made to axial and radial directions. In the present invention the axial direction is through the axis of the optical element perpendicular to the surface of the element, while the radial direction is perpendicular to the axial direction.

While this specification has been particularly directed to ophthalmic devices employing rotatable light polarizing elements it will be appreciated that the broader implications of the present invention go to the relationship of a spectacle frame in engagement with a mechanically biased, moveable lens element whereby the lens element is urged to maintain a predetermined axial position by the biasing force. The lens element will preferably be a light polarizer but may, of course, be another optical element such as, for example, a wave plate, etc.

Since certain changes may be made in the above invention without departing from the scope of the invention herein involved, it is intended that all matter contained herein or shown in the accompanying drawings shall be interpreted as illustrative and not in a limiting sense.

What is claimed is:

1. An ophthalmic device comprising:
   a spectacle frame member adapted to engage first and second pairs of light polarizing elements;
   a first pair of light polarizing elements fixedly held by a said frame member;
   a second pair of light polarizing elements which are superposed and substantially coextensive with the first pair of light polarizing elements and rotatable with respect to said first pair of light polarizing elements to provide variable light transmission, said frame member including lips which prevent substantial radial movement of said moveable light polarizing elements; and
   biasing means fixedly attached to each of said rotatable light polarizing elements and in engagement with respective portions of said frame member associated with each fixedly held light polarizing element whereby movement of said biasing means causes rotation of said rotatable light polarizing elements, said biasing means acting to urge each of said rotatable light polarizing elements axially toward the respective fixedly held light polarizing element with which it is superposed, said biasing means comprising a generally U-shaped element comprising first and second legs and a cross-member, said second leg comprising an offset portion which offset is toward said first leg.

2. The ophthalmic device of claim 1 wherein the portions of said frame member engaged by the biasing means are arcuate.

3. The ophthalmic device of claim 2 wherein at least one of the arcuate frame member portions includes stops which limit the rotation of the rotatable light polarizing elements.

4. The ophthalmic device of claim 1 wherein the biasing means fixedly attached to each of the rotatable light polarizing elements are connected by a tie bar so that rotation of one of said rotatable light polarizing elements causes a substantially equal rotation of the other rotatable light polarizing element.

5. The ophthalmic device of claim 1 wherein the rotatable light polarizing elements are fixedly attached to the offset portion of the biasing means on the side of that portion adjacent the first leg and the first leg engages the frame member so that adequate biasing is provided to prevent substantial axial movement of the rotatable light polarizing elements.

6. The ophthalmic device of claim 5 wherein the biasing means includes a shim which is positioned between the first and second legs and in contact with the cross-member and arcuate area of the frame member engaged by the biasing means.

7. An ophthalmic device comprising:
   a spectacle frame member adapted to engage first and second pairs of light polarizing elements;
   a first pair of light polarizing elements fixedly held by a said frame member;
   a second pair of light polarizing elements which are superposed and substantially coextensive with the first pair of light polarizing elements and rotatable with respect to said first pair of light polarizing elements to provide variable light transmission;

said frame member including lips which prevent substantial radial movement of said movable light polarizing elements, said frame member lips comprising annular channels which constrain the rotatable light polarizing elements against radial movement and are at least as deep as the thickness of the rotatable light polarizing elements; and biasing means fixedly attached to each of said rotatable light polarizing elements and in engagement with respective portions of said frame member associated with each fixedly held light polarizing element whereby movement of said biasing means causes rotation of said rotatable light polarizing elements, said biasing means acting to urge each of said rotatable light polarizing elements axially toward the respective fixedly held light polarizing element with which it is superposed.

* * * * *